(12) United States Patent
Nakami

(10) Patent No.: US 7,933,041 B2
(45) Date of Patent: Apr. 26, 2011

(54) ADJUSTMENT FOR OUTPUT IMAGE OF IMAGE DATA

(75) Inventor: Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 800 days.

(21) Appl. No.: 11/820,998

(22) Filed: Jun. 20, 2007

(65) Prior Publication Data

US 2007/0247650 A1    Oct. 25, 2007

Related U.S. Application Data

(63) Continuation of application No. 10/239,615, filed as application No. PCT/JP02/01060 on Feb. 7, 2002, now abandoned.

(30) Foreign Application Priority Data

Feb. 9, 2001    (JP) .................................... 2001-34539

(51) Int. Cl.
   *B41B 1/02*    (2006.01)

(52) U.S. Cl. ........................................ 358/1.9; 358/3.27

(58) Field of Classification Search .................. 358/1.1, 358/1.9, 3.27, 401, 406, 448, 475, 296, 909.1; 382/274
   See application file for complete search history.

(56) References Cited

U.S. PATENT DOCUMENTS

| | | | |
|---|---|---|---|
| 5,995,194 A | 11/1999 | Terashita | |
| 6,011,547 A | 1/2000 | Shiota et al. | |
| 6,273,535 B1 | 8/2001 | Inoue et al. | |
| 2002/0044304 A1 | 4/2002 | Ochiai | |

FOREIGN PATENT DOCUMENTS

| | | |
|---|---|---|
| EP | 0 905 964 | 3/1999 |
| JP | 06-008537 | 1/1994 |
| JP | 09-219817 | 8/1997 |
| JP | 09-307676 | 11/1997 |
| JP | 10-186541 | 7/1998 |
| JP | 10-191246 | 7/1998 |
| JP | 10-226139 | 8/1998 |
| JP | 11-041622 | 2/1999 |
| JP | 11-088672 | 3/1999 |
| JP | 11-127415 | 5/1999 |
| JP | 11-327605 | 11/1999 |

(Continued)

OTHER PUBLICATIONS

Abstract of Japanese Patent Publication No. 06-008537, Pub. Date: Jan. 18, 1994, Patent Abstracts of Japan.

(Continued)

*Primary Examiner* — Thomas D Lee
(74) *Attorney, Agent, or Firm* — Martine Penilla & Gencarella, LLP

(57) ABSTRACT

If a memory card MC is inserted in a slot 34, a control circuit 30 of a color printer 20 acquires image output control information GI from the memory card MC and analyzes this information. A CPU 31 modifies a brightness standard value Bstd corresponding to a brightness parameter by taking account of a preset exposure bias value when an exposure bias value other than zero is set. The CPU 31 determines the brightness correction level Brev by correcting the brightness representative value Brep so as to bring it closer to the brightness standard value Bstd that has been modified, and adjusts the image quality of image data by taking account of the brightness correction level Brev. As a result, the image quality of image data can be automatically adjusted without degrading output conditions that have been set arbitrarily.

20 Claims, 11 Drawing Sheets

FOREIGN PATENT DOCUMENTS

| | | |
|---|---|---|
| JP | 11-331596 | 11/1999 |
| JP | 2000-013616 | 1/2000 |
| JP | 2000-013718 | 1/2000 |
| JP | 2000-137806 | 5/2000 |
| JP | 2001-147481 | 5/2001 |

OTHER PUBLICATIONS

Abstract of Japanese Patent Publication No. 06-167756, Pub. Date: Jun. 14, 1994, Patent Abstracts of Japan.

Abstract of Japanese Patent Publication No. 09-219817, Pub. Date: Aug. 28, 1997, Patent Abstracts of Japan.

Abstract of Japanese Patent Publication No. 09-307676, Pub. Date: Nov. 28, 1997, Patent Abstracts of Japan.

Japan Electronic Industry Development Association, Digital Still Camera Image File Format Standard (Exchangeable image file format for Digital Still Cameras: Exif) Version 2.1, Jun. 12, 1998 (pp. 1-166).

Abstract of Japanese Patent Publication No. 10-186541, Pub. Date: Jul. 14, 1998, Patent Abstracts of Japan.

Abstract of Japanese Patent Publication No. 10-191246, Pub. Date: Jul. 21, 1998, Patent Abstracts of Japan.

Abstract of Japanese Patent Publication No. 10-226139, Pub. Date: Aug. 25, 1998, Patent Abstracts of Japan.

Abstract of Japanese Patent Publication No. 11-041622, Pub. Date: Dec. 12, 1999, Patent Abstracts of Japan.

Abstract of Japanese Patent Publication No. 11-088672, Pub. Date: Mar. 30, 1999, Patent Abstracts of Japan.

Abstract of Japanese Patent Publication No. 11-127415, Pub. Date: May 11, 1999, Patent Abstracts of Japan.

Abstract of Japanese Patent Publication No. 11-327605, Pub. Date: Nov. 26, 1999, Patent Abstracts of Japan.

Abstract of Japanese Patent Publication No. 11-331596, Pub. Date: Nov. 30, 1999, Patent Abstracts of Japan.

Abstract of Japanese Patent Publication No. 2000-013616, Pub. Date: Jan. 14, 2000, Patent Abstracts of Japan.

Abstract of Japanese Patent Publication No. 2000-013718, Pub. Date: Jan. 14, 2000, Patent Abstracts of Japan.

Abstract of Japanese Patent Publication No. 2000-137806, Pub. Date: May 16, 2000, Patent Abstracts of Japan.

Abstract of Japanese Patent Publication No. 2001-147481, Pub. Date: May 29, 2001, Patent Abstracts of Japan.

| TAG NAME | PARAMETER VALUE |
|---|---|
| EXPOSURE TIME | 1/137 SEC |
| LENS F VALUE | F10. 1 |
| EXPOSURE BIAS VALUE | EV0. 4 |
| RELEASE F VALUE | F2. 0 |
| LENS FOCAL DISTANCE | 20. 70(mm) |
| COLOR SPACE INFORMATION | sRGB |
| LIGHT SOURCE | 0 |

112 APPENDED INFORMATION STORAGE REGION

ADJUSTMENT FOR OUTPUT IMAGE OF IMAGE DATA

CROSS-REFERENCE TO RELATED APPLICATION

This application is a continuation of U.S. application Ser. No. 10/239,615, filed on Sep. 23, 2002, the disclosure of which is incorporated by reference (now abandoned), which is a national phase entry of PCT/JP02/01060, filed on Feb. 7, 2002. The disclosures of these prior applications are hereby incorporated by reference in their entirety for all purposes.

TECHNICAL FIELD

The present invention relates to image adjustment technology for adjusting the image quality of image data.

BACKGROUND ART

Image quality of image data generated by digital still cameras (DSC), digital video cameras (DVC), scanners, and the like, can be adjusted at one's discretion by image retouch applications on personal computers. The image adjustment function for automatic adjustment of image quality of image data is typically provided in image retouch applications, and the image quality of image data output from an output device can be easily improved if this image adjustment function is used. Well-known examples of output devices for image files include CRT, LCD, printers, projectors, TV receivers, and the like.

Printer drivers controlling the operation of printers, which are the output devices, are also provided with the function of automatic adjustment of image quality of image data, and the image quality of image data which is to be printed can be also easily improved by using such printer drivers.

However, with the image quality automatic adjustment function provided by such image retouch applications and printer drivers, image quality correction is conducted by using as a standard the image data having typical image quality characteristic. By contrast, image data which are the object of image processing can be generated under a variety of different conditions. Therefore, image quality sometimes cannot be improved by executing indiscriminately the image quality automatic adjustment function and changing the image quality parameter values of image data by using the standard values.

Further, in some of image data generation devices, such as DSC and the like, image quality of image data can be adjusted at one's discretion during image data generation, and the user can intentionally generate image data with the prescribed image quality. When the image quality automatic adjustment function is executed with respect to such image data, the problem is that the adjustment is automatically conducted based on the image quality serving as a standard till the intended image quality of the image data, and automatic image adjustment reflecting the user's intention cannot be executed. This problem is not limited to DSC and is a common problem for other image data generation devices such as DVC and the like.

DISCLOSURE OF THE INVENTION

The present invention has been created to resolve the above-described problem, and it is an object of the present invention to adjust automatically and appropriately the image quality correspondingly to individual image data. Another object is to adjust automatically the image quality of image data, without degrading the output conditions that have been set arbitrarily.

In order to resolve the above-described problems, in accordance with the first aspect of the present invention, an output device which uses the image data and image output control information, which contains at least the exposure bias value information in image data generation and has been associated with the image data, and outputs the image data is provided. The output device according to the first aspect of the present invention comprises image parameter value acquisition means for analyzing the image data and acquiring the value of the image quality parameter indicating at least the characteristic of the image data, which relates to brightness, image quality adjustment means for adjusting the image quality of the image data based on the standard image quality parameter value that has been determined in advance with respect to the image quality parameter value relating at least to the brightness, the acquired image quality parameter value, and the exposure bias value, and output means for outputting the image data that have been subjected to the image quality adjustment.

With the output device according to the first aspect of the present invention, the image quality of image data is adjusted based on the standard image quality parameter value corresponding to the image quality parameter value relating at least to the brightness, the image quality parameter value relating to the brightness, and the exposure bias value information. Therefore, the image quality of image data can be automatically adjusted without degrading the output conditions that have been set arbitrarily, for example, brightness conditions. Further, the image quality can be appropriately automatically adjusted correspondingly to individual image data. Therefore, when bright output results are intended, the bright output results are obtained, and when dark output results are intended, the dark output results are obtained.

In the output device according to the first aspect of the present invention, image quality adjustment means may adjust the image quality of image data so as to reduce or eliminate the deviation of the image quality parameter value from the standard image quality parameter value reflecting with the exposure bias value information. Because such a configuration is provided, the image quality of image data is adjusted so as to reduce or eliminate the deviation of the image quality parameter value from the standard image quality parameter value reflecting with the exposure bias value information. Therefore, the image quality of image data can be automatically adjusted without degrading the output conditions that have been set arbitrarily, for example, brightness conditions, and the image quality can be appropriately automatically adjusted correspondingly to individual image data.

In the output device according to the first aspect of the present invention, image quality adjustment means may adjust the image quality of image data by calculating the image quality adjustment quantity from the standard image quality parameter value and the image quality parameter value, modifying the image quality adjustment quantity reflecting with the exposure bias value information, and using the image quality adjustment quantity thus modified. Alternatively, the output device according to the first aspect of the present invention may further comprise standard image quality parameter value modification means for modifying the standard image quality parameter value based on the exposure bias value information, and image quality adjustment means may adjust the image quality of the image data based on the modified standard image quality parameter value and the acquired image quality parameter value, instead of the standard image quality parameter value, acquired image quality parameter value, and exposure bias value information.

With the output device according to the first aspect of the present invention, the image quality of image data can be adjusted by computing the image quality adjustment quantity from the standard image quality parameter value and image quality parameter value, modifying the image quality adjustment quantity reflecting with the exposure bias value information, and using the image quality adjustment quantity thus modified. Alternatively, the standard image quality parameter value corresponding to the image quality parameter value relating at least to the brightness can be modified and the image quality of image data can be adjusted based at least on the modified standard image quality parameter value and the image quality parameter value relating to the brightness. Therefore, the image quality of image data can be automatically adjusted without degrading the output conditions that have been set arbitrarily, for example, brightness conditions. Further, the image quality can be appropriately automatically adjusted correspondingly to individual image data. Consequently, when bright output results are intended, the bright output results are obtained, and when dark output results are intended, the dark output results are obtained.

In the output device according to the first aspect of the present invention, standard image quality parameter value modification means may execute no modification of the standard image quality parameter value when the exposure bias value has been set to zero as a result of analysis of the image output control information. In such a case a decision can be made that no arbitrary output conditions have been set with respect to brightness. Therefore, no output results reflecting the photographer's intentions are provided even though the standard image quality parameter value has not been modified.

In accordance with the second aspect of the present invention, an image data processing device which uses image data and image output control information, which contains at least the exposure bias value information in image data generation and has been associated with the image data, and processes the image data is provided. The image data processing device according to the second aspect of the present invention comprises obtaining means for obtaining the image data and the image output control information, image parameter value acquisition means for analyzing the image data that has been downloaded and acquiring the value of the image quality parameter indicating at least the characteristic of the image data, which relates to brightness, and image quality adjustment means for adjusting the image quality of the image data based on the standard image quality parameter value that has been determined in advance with respect to the image quality parameter value relating at least to the brightness, the acquired image quality parameter value, and the exposure bias value information.

With the image data processing device according to the second aspect of the present invention, the function and effect can be obtained which is similar to that of the output device according to the first aspect of the present invention. Furthermore, the image data processing device according to the second aspect of the present invention can be implemented in a variety of modes similarly to the output device according to the first aspect of the present invention.

According to the third aspect of the present invention, a method for image quality adjustment of image data is provided. The method for image quality adjustment according to the third aspect of the present invention comprises: acquiring image data and image output control information which contains at least the exposure bias value information during image data generation and has been associated with the image data, analyzing the image data and acquiring the value of the image quality parameter indicating at least the characteristic of the image data, which relates to brightness, analyzing the image output control information and acquiring the exposure bias value from the exposure bias value information, and adjusting the image quality of the image data based on the standard image quality parameter value that has been determined in advance, the acquired image quality parameter value, and the exposure bias value.

With the method for image quality adjustment according to the third aspect of the present invention, the function and effect can be obtained which is similar to that of the output device according to the first aspect of the present invention. Furthermore, the method for image quality adjustment according to the third aspect of the present invention can be implemented in a variety of modes similarly to the output device according to the first aspect of the present invention.

According to the fourth aspect of the present invention, a computer-readable medium storing a program for adjusting the image quality of image data is provided. In the computer-readable medium according to the fourth aspect of the present invention, the program instructs the computer to executes functions of: acquiring image data and image output control information which contains at least the exposure bias value information during image data generation and has been associated with the image data, analyzing the image data and acquiring the value of the image quality parameter indicating at least the characteristic of the image data, which relates to the brightness, analyzing the image output control information and acquiring the exposure bias value from the exposure bias value information, and adjusting the image quality of the image data based on the standard image quality parameter value that has been determined in advance, the image quality parameter value, and the exposure bias value.

With the computer-readable medium according to the fourth aspect of the present invention, the function and effect can be obtained which is similar to that of the output device according to the first aspect of the present invention. Furthermore, the computer-readable medium according to the fourth aspect of the present invention can be implemented in a variety of modes similarly to the output device according to the first aspect of the present invention.

According to the fifth aspect of the present invention, an image data generation device for generating image data that has been associated with image processing conditions of image data in an output device is provided. The image data generation device according to the fifth aspect of the present invention comprises image data generation means for generating image data, exposure bias value information acquisition means for acquiring exposure bias value information, image quality parameter value acquisition means for analyzing the generated image data and acquiring the value of image quality parameter indicating at least the characteristic of the image data, which relates to the brightness, image processing conditions generation means for generating the image processing conditions based on the standard image quality parameter value that has been determined in advance with respect to the image quality parameter value relating to the brightness, the acquired image quality parameter value, and the exposure bias value information, and output means for outputting the generated image processing conditions and the image data associated with each other.

With the image generation device according to the fifth aspect of the present invention, image processing conditions of image data in the output device are generated based on the standard image quality parameter value, image quality parameter value relating to the brightness, and the exposure bias value information. Therefore, image processing of image data can be easily executed without finding the image processing conditions in the output device. Furthermore, the image quality of image data can be automatically adjusted without degrading the output conditions that have been set arbitrarily, for example, brightness conditions, and the image quality can be appropriately automatically adjusted correspondingly to individual image data. Therefore, when bright output results are intended, the bright output results are obtained, and when dark output results are intended, the dark output results are obtained. Further, the image data and image processing conditions may be associated with each other and stored in the same file.

DESCRIPTION OF THE PREFERRED EMBODIMENTS

The output image adjustment of the image file in accordance with the present invention will be described hereinbelow in the sequence as follows based on several embodiments thereof, with reference to the appended drawings.
A. Configuration of image data output system.
B. Configuration of image file.
C. Configuration of image data system that can use the image file.
D. Image processing in digital still camera.
E. Image processing in printer.
F. Other embodiments.

A. Configuration of Image Data Output System.

Figure 1:
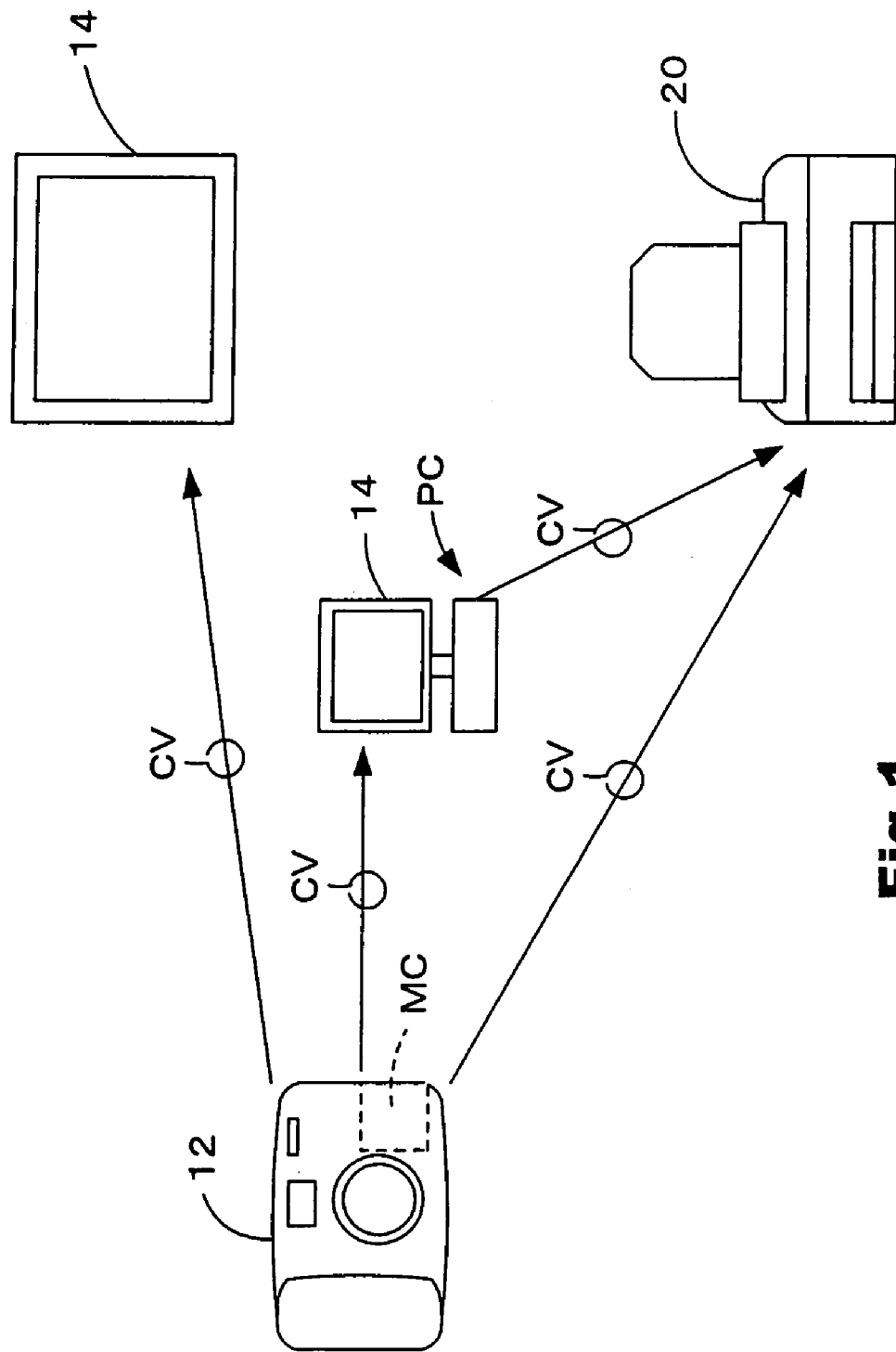
FIG. 1 illustrates an example of an image data output system that can employ the image output device of the present embodiment.
Figure 2:
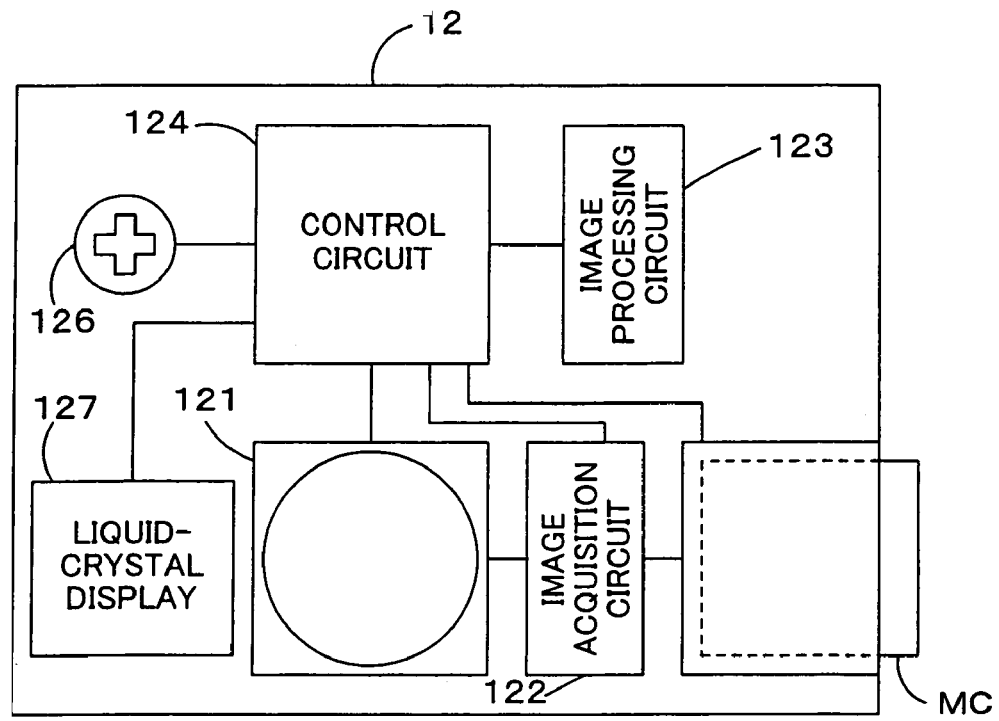
FIG. 2 is a block diagram illustrating the schematic configuration of a digital still camera that can generate an image file (image data) which is output by the image output device of the present embodiment.

The configuration of the image data output system that can employ the image output device implementing the image output adjustment of the present embodiment will be described below with reference to FIGS. 1 and 2. FIG. 1 illustrates an example of the image data output system that can employ the image output device of the first embodiment. FIG. 2 is a block diagram illustrating the schematic configuration of the digital still camera that can generate an image file (image data) which is output by the image output device of the first embodiment.

An image data output system 10 comprises a digital still camera 12 as an input device generating an image file, and a color printer 20 serving as an output device for executing image processing based on the image file generated by the digital still camera 12 and outputting the images. Besides the printer 20, a monitor 14 such as a CRT display, LCD display, and the like, or a projector can be used as the output device. In the explanation below, it will be assumed that the color printer 20 is used as the output device.

The digital still camera 12 is a camera acquiring images by forming an image of optical information on a digital device (CCD or photoelectronic multiplier). As shown in FIG. 2, the digital still camera comprises an optical circuit 121 provided with a CCD or the like for converging optical information, an image acquisition circuit 122 for controlling the optical circuit 121 and acquiring the image, an image processing circuit 123 for treating and processing the acquired digital images, and a control circuit 124 comprising a memory and controlling all of the above circuits. The digital still camera 12 stores the acquired images as digital data in a memory card MC serving as a storage device. The storage format for image data in the digital still camera 12 is usually a JPEG format, but other storage formats, for example, a TIFF format, GIF format, BMP format, and the like can be also used.

The digital still camera 12 also comprises a selection-determination button 126 for setting a photographing mode, an exposure bias value (exposure correction value), a light source, and the like, and a liquid-crystal display 127 for previewing the picked-up images or for setting the photographing mode by using the selection-determination button 126. The exposure bias value which is set in the digital still camera 12 is represented by an exposure quantity EV, and when no exposure correction is conducted, this quantity is recorded as EV=±0. When it is desired that the exposure be corrected so as to obtain a brighter image with respect to the proper exposure automatically set in the digital still camera 12, the exposure bias value is set at a positive side as +0.1 EV, +2.0 EV, and when the correction of exposure to a darker image with respect to the proper exposure is desired, the exposure bias value is set at a negative side as −0.1 EV, −2.0 EV.

In the digital still camera 12 used in the present image data output system 10, in addition to the image data GD, the image output control information GI is stored as an image file GF in the memory card. Thus, during photographing, the image output control information GI together with the image data GD is automatically put as an image file GF into the memory card MC. Furthermore, when the user has in advance selected the photographing mode, such as a portrait or night view mode, an image file GF containing a parameter value of the image quality parameter, which corresponds to the selected photographing mode, as the image output control information GI is put into the memory card MC. Alternatively, when a parameter such as an exposure bias value, light source, and the like is set for any value, an image file GF containing a set value of the parameter, which has been set, as the image output control information GI in put into the memory card MC.

When photographing has been executed in an automatic photographing mode in the digital still camera 12, an image file GF containing values of parameters, such as the exposure time, light source, diaphragm, shutter speed, focal distance of the lens, and the like during the photographing, as the image output control information is put into the memory card MC. Further, parameters employed in photographing modes and parameter values are stored in a memory in a control circuit 124 of the digital control camera 12.

The image file generated in the digital still camera 12 is transmitted to a color printer 20, for example, via a cable CV and computer PC or a cable CV. Alternatively, the image file is transmitted to the color printer via a computer PC having installed in a memory card slot thereof the memory card MC that has stored the image file GF in the digital still camera 12, or by directly connecting the memory card MC to the printer 20. The explanation provided hereinbelow will relate to the case in which the memory card is directly connected to the color printer 20.

B. Configuration of Image File

Figure 3:
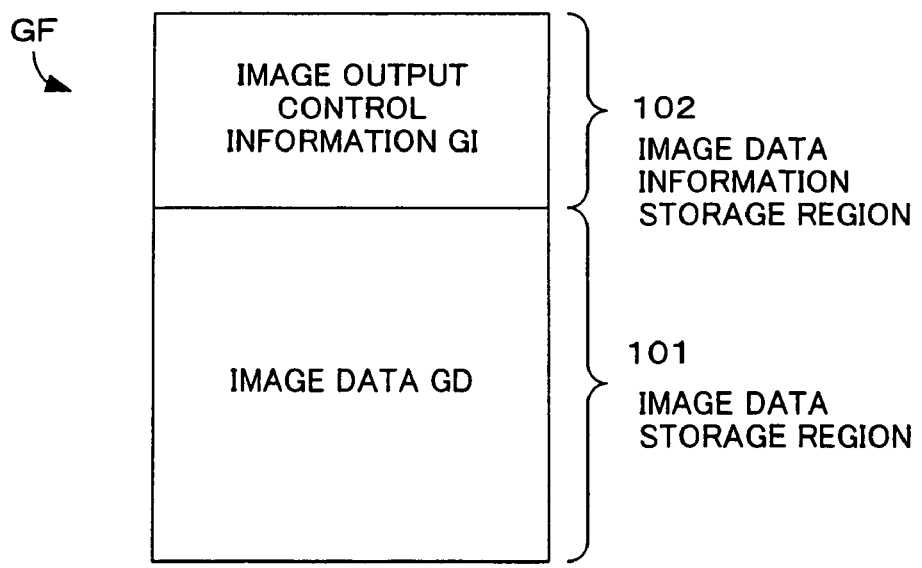
FIG. 3 illustrates schematically the internal configuration of the image file that can be used in the present embodiment.

A schematic configuration of the image file that can be used in the present embodiment will be described below with reference to FIG. 3. FIG. 3 is an explanatory figure illustrating schematically an example of the internal configuration of the image file that can be used in the present embodiment. The image file GF comprises an image data storage region 101 for storing the image data GD and an image output control information storage region 102 for storing the information GI controlling the output state of image data (image output control information). The image data is stored, for example, in the JPEG format, and the image output control information GI is stored in the TIFF format. The terms file structure, data structure, and storage region in the present embodiment mean images of files or data in a state in which the files or data have been stored in a memory device.

The image output control information GI is the information (image quality generation information) relating to the image quality in the case of image data generating (photographing) in an image data generation device such as the digital still camera 12 or the like and can contain parameters relating to exposure time, ISO sensitivity, diaphragm, shutter speed, and focal distance that are automatically generated in the course of photographing, and also the output control parameters such as the exposure bias value, light source, photographing mode, target color space, and the like, that are arbitrarily set by the user.

The above-mentioned image file GF of the present embodiment can be generated by input devices (image file generation devices) other than the digital still camera 12, for example, by digital video cameras, scanners, and the like.

The image file GF of the present embodiments basically may comprise the above-mentioned image data region 101 and image output control information storage region 102 and can have a file structure corresponding to the file format that has already been standardized. The case in which the image file GF of the present invention was conformed to the standardized file format will be described below in greater detail.

Figures 4, 5:
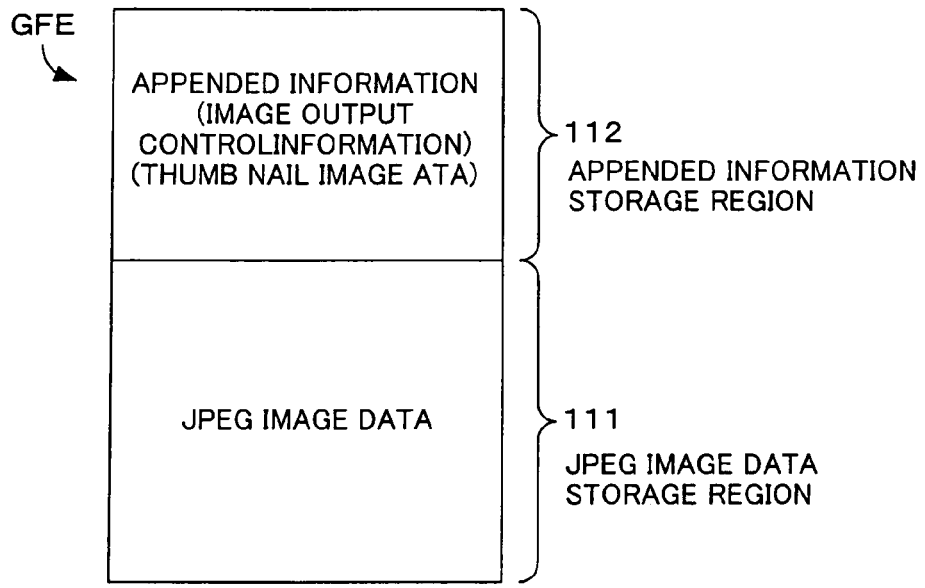
FIG. 4 illustrates a schematic internal structure of the image file that has been stored in the Exif file format.
FIG. 5 illustrates an example of the data structure of the appended information storage region 112 of the image file GF that can be used in the present embodiment.

The image file GF of the present embodiment, for example, can have a file structure corresponding to an image file format standard for digital still cameras (Exif). Specifications of Exif files are determined by the Japanese Electronic Information Technology Association (JEITA). The schematic internal structure of the file in the case when the image file GF of the present embodiment has a file format corresponding to the Exif file format will be described hereinbelow with reference to FIG. 4. FIG. 4 is an explanatory figure illustrating the schematic internal structure of the image file GF of the present embodiment, which was stored in the Exif file format.

The image file GFE as an Exif file comprises a JPEG image data storage region 111 for storing image data in JPEG format and an appended information storage region 112 for storing various information relating to the JPEG image data that has been stored. The JPEG data storage region 111 is equivalent to the above-described image data storage region 101, and the appended information storage region 112 is equivalent to the above-described image output control information storage region 102. Thus, the image output control information (image output control information GI) referred to when the JPEG image is output, such as photographing date and time, exposure, shutter rate, light source, exposure bias value, target color space, and the like, is stored in the appended information storage region 112. Furthermore, in addition to the image output control information GI, the thumb nail image data of JPEG images that has been stored in the JPEG image data storage region 111 is stored in the TIFF format in the appended information storage region 112. It is well known to those skilled in the art that in the Exif format files, tags for specifying data are used and the data are sometimes named by the tag names.

The data structure of appended information storage region 112 will be explained below in greater detail with reference to FIG. 5. FIG. 5 illustrates an example of the data structure of appended information storage region 112 of image file GF that can be used in the present embodiment.

In the appended information storage region 112, as shown in the figure, the parameter values relating to information such as the exposure time, lens F value, exposure control mode, ISO sensitivity, exposure bias value, light source, flash, focal distance and the like are stored according to the preset addresses. In the output device, the image output control information GI can be acquired by indicating the address corresponding to the desired information (parameter).

C. Configuration of Image Output Device

Figure 6:
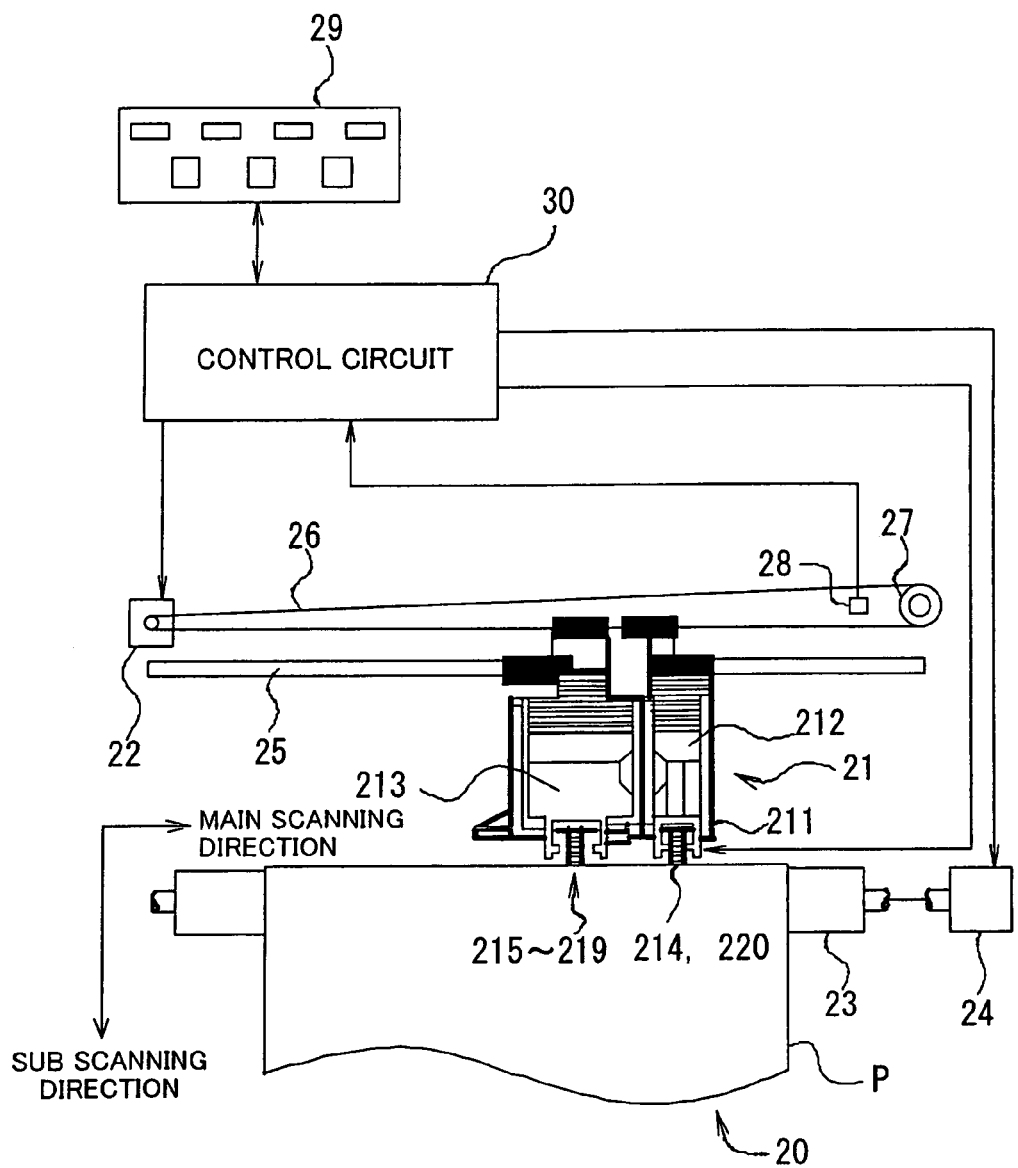
FIG. 6 is a block diagram illustrating the schematic configuration of the color printer 20 of the present embodiment.

The schematic configuration of the image output device, that is, color printer 20 of the present embodiment will be described below with reference to FIG. 6. FIG. 6 is a block diagram illustrating the schematic configuration of color printer 20 of the present embodiment.

The color printer 20 is a printer that can output color images, for example, an ink-jet printer in which an image is formed by ejecting color inks of four colors, cyan (C), magenta (M), yellow (Y), and black (K), on a printing medium and forming a dot pattern. Alternatively, the color printer is an electrophotographic printer in which an image is formed by transferring a color toner on a printing medium and fixing it thereon. In addition to the above-mentioned four colors of color inks, light cyan (LC), light magenta (LM), and dark yellow (DY) may be used.

The color printer 20, as shown in the figure, is composed of a mechanism for driving a printing head 211 carried on a carriage 21, ejecting the inks, and forming dots, a mechanism for reciprocally moving the carriage 21 in the axial direction of a platen 23 with a carriage motor 22, a mechanism for transporting printing paper P with a paper-feeding motor 24, and a control circuit 30. The mechanism for reciprocally moving the carriage 21 in the axial direction of platen 23 is composed of a sliding shaft 25 for slidably supporting the carriage 21 installed parallel to the axis of platen 23, a pulley 27 for stretching an endless driving belt 26 between the carriage motor 22 and the pulley, and a position detection sensor for detecting the original position of carriage 21. The mechanism for transporting printing paper P is composed of the platen 23, paper-feeding motor 24 for rotating the platen 23, an appended paper-supplying roller (not shown in the figures), and a gear train (not shown in the figures) for transferring the rotation of paper-feeding motor 24 to the platen 23 and appended paper-supplying roller.

The control circuit 30 appropriately controls the movement of paper-feeding motor 24, carriage motor 22, and printing head 211, while exchanging signals with a control panel 29 of the printer. Printing paper P fed to the color printer 20 is set so as to be squeezed between the platen 23 and appended paper-supplying roller and transported through the prescribed distance according to the rotation angle of platen 23

An ink cartridge 212 and an ink cartridge 213 are installed in the carriage 21. The ink cartridge 212 accommodates black (K) ink, whereas other inks, that is, inks of a total of six colors: inks of light cyan (LC), light magenta (LM), and dark yellow (DY) colors in addition to inks of three colors, cyan (C), magenta (M), and yellow (Y).

Figure 7:
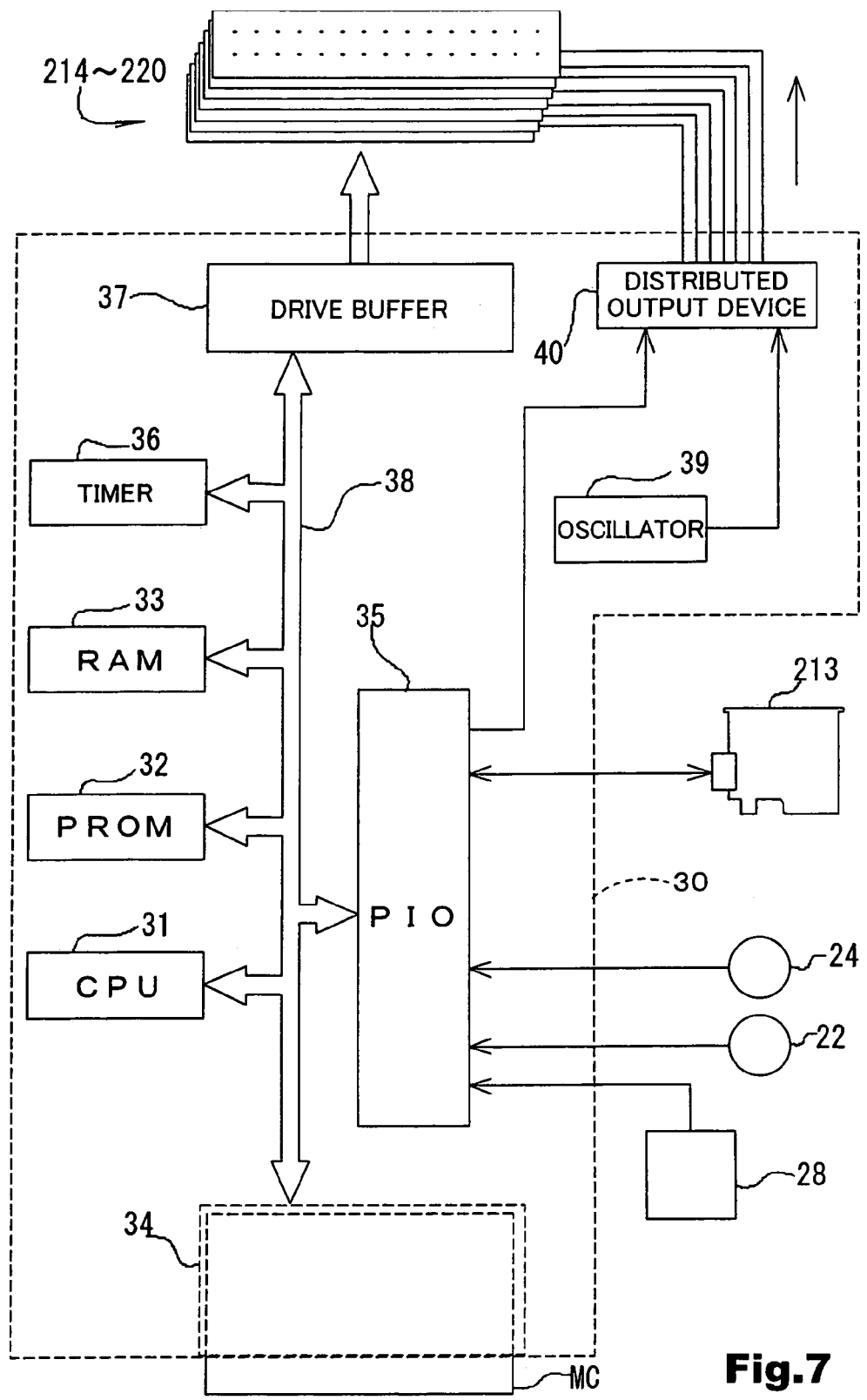
FIG. 7 illustrates the internal configuration of the control circuit 30 of color printer 20.

The internal configuration of the control circuit 30 of color printer 20 will be explained below with reference to FIG. 7. FIG. 7 illustrates the internal configuration of the control circuit 30 of color printer 20. As shown in the figure, inside the control circuit 30 there are provided a CPU 31, a PROM 32, a RAM 33, a PCMCIA slot 34 for acquiring data from the memory card MC, a peripheral input/output unit (PIO) conducting data exchange with the paper-feeding motor 24 and carriage motor 22, a timer 36, a drive buffer 37, and the like. The drive buffer 37 is used as a buffer supplying dot on-off signals to the ink ejection heads 214 to 220. The above-described components are connected to each other with a bus 38, allowing for data exchange therebetween. Furthermore, the control circuit 30 is also provided with an oscillator 39 outputting a drive waveform with the prescribed frequency, and a distributed output device 40 for distributing the output from the oscillator 39 to the ink ejection heads 214 to 220 with the prescribed timing.

The control circuit 30 reads out an image file 100 from the memory card MC, analyzes the appended information, and executes image processing based on the analyzed control information Al. The control circuit 30 outputs dot data to the drive buffer 37 with the prescribed timing, in synchronism with the movement of paper-feeding motor 24 or carriage motor 22. The comprehensive flow of image processing executed by the control circuit 30 will be described below.

D. Image Processing in Digital Still Camera

Figure 8:
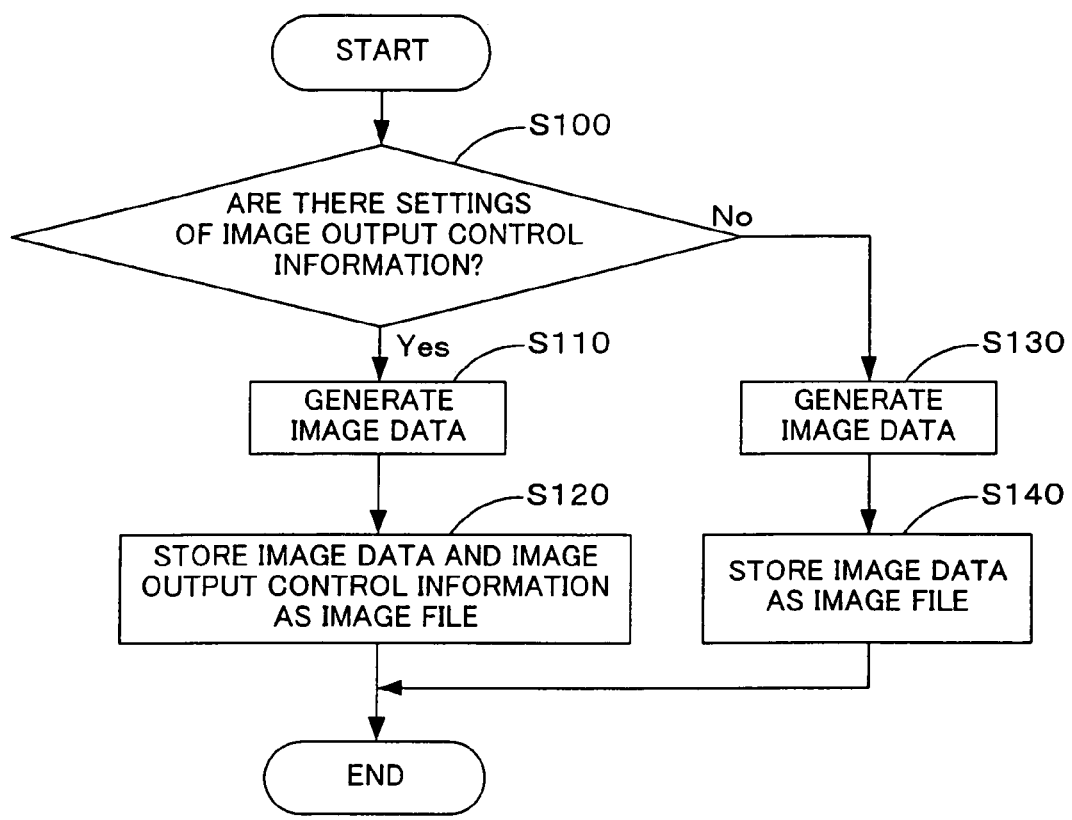
FIG. 8 is a flow chart illustrating the flow of generation processing of the image file GF in the digital still camera 12.

Image processing in the digital still camera will be described below with reference to FIG. 8. FIG. 8 is a flow chart illustrating the flow of generation and processing of an image file GF in the digital still camera 12.

The control circuit 124 of digital still camera 12 makes a decision (step S100) as to whether the photographing mode or the image output control information, such as light source exposure bias value, and the like, has been set by the user prior to photographing. Setting of the image output control information is executed by the user who operates the selection-setting button 126 and makes a selection from the photographing modes that have been prepared in advance and are displayed on a liquid-crystal display 127. Alternatively, it is executed by the user who operates the selection-setting button 126 in a similar manner and changes the settings on the liquid crystal display 127.

When the control circuit 124 decides that the image output control information has been set (step S100: Yes), the circuit generates image data (step S110) by using parameter values stipulated by the image output control information, which has been set, according to the photographing requirements, for example, by pushing of the shutter button. The control circuit 124 puts the generated image data GD and the image output control information GI containing the output conditions which have been discretionary set and output conditions which are provided automatically, as the image file GF into the memory card MC (step S120), thereby ending the present processing routine. Data generated in the digital still camera 12 are converted from the RGB color space and represented by the YCbCr color space.

By contrast, when the control circuit 124 decides that the image output control information has not been set (step S100: No), the image data GD is generated according to photographing requirements (step S130). The control circuit 124 puts the generated image data GD and the image output control information GI containing the output conditions which are provided automatically during image data generation, as the image file GF into the memory card MC (step S140), thereby ending the present processing routine.

Because of the above-described processing executed in the digital still camera 12, the image file GF that has been stored in the memory card is provided with the image data GD and also image output control information GI containing values of various parameters during image data generation.

E. Image Processing in Color Printer 20

Figure 9:
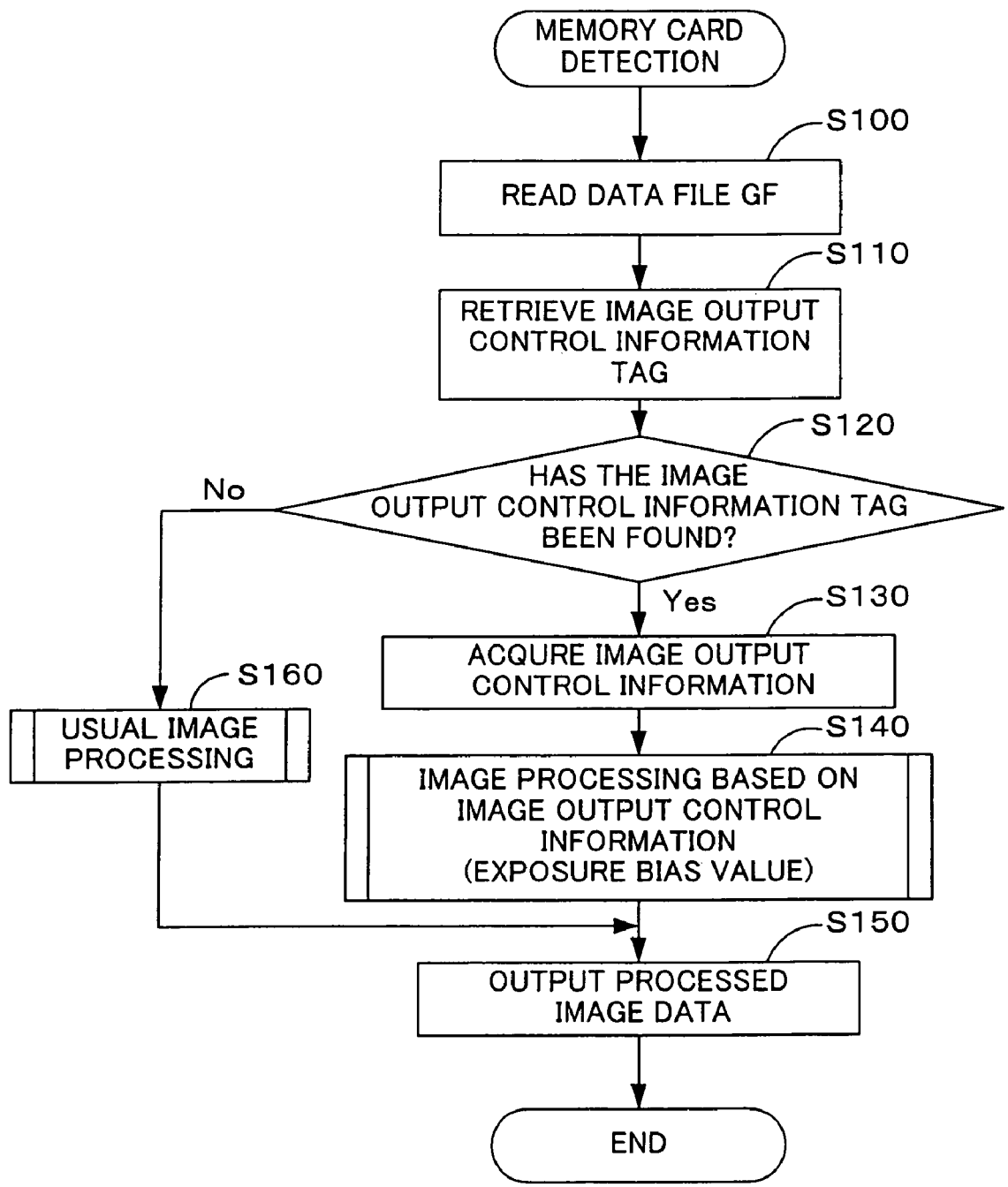
FIG. 9 is a flow chart illustrating the processing routine of printing processing in the color printer 20 of the present embodiment.
Figure 10:
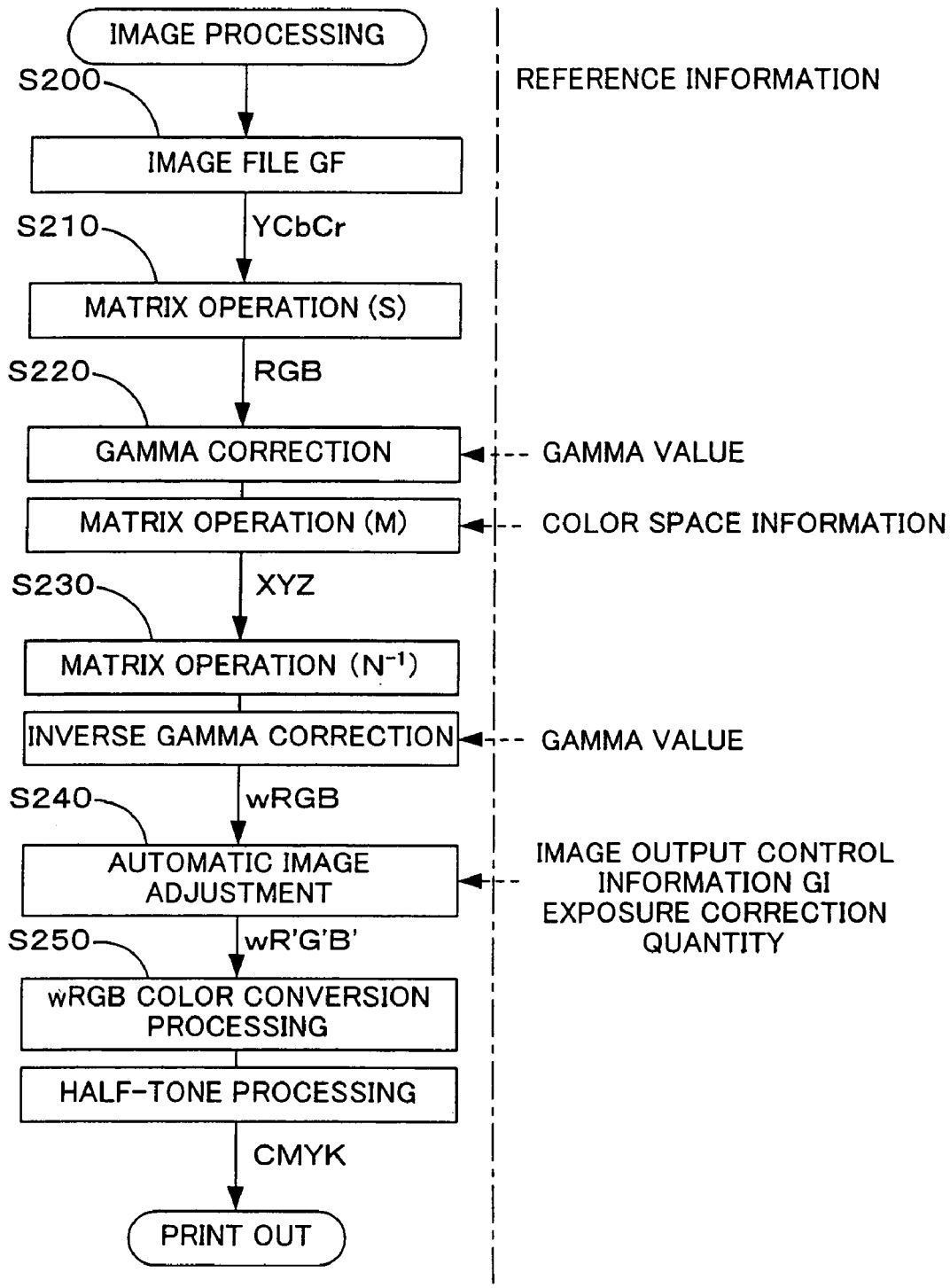
FIG. 10 is a flow chart illustrating the flow of image processing in the color printer 20 of the present embodiment.
Figure 11:
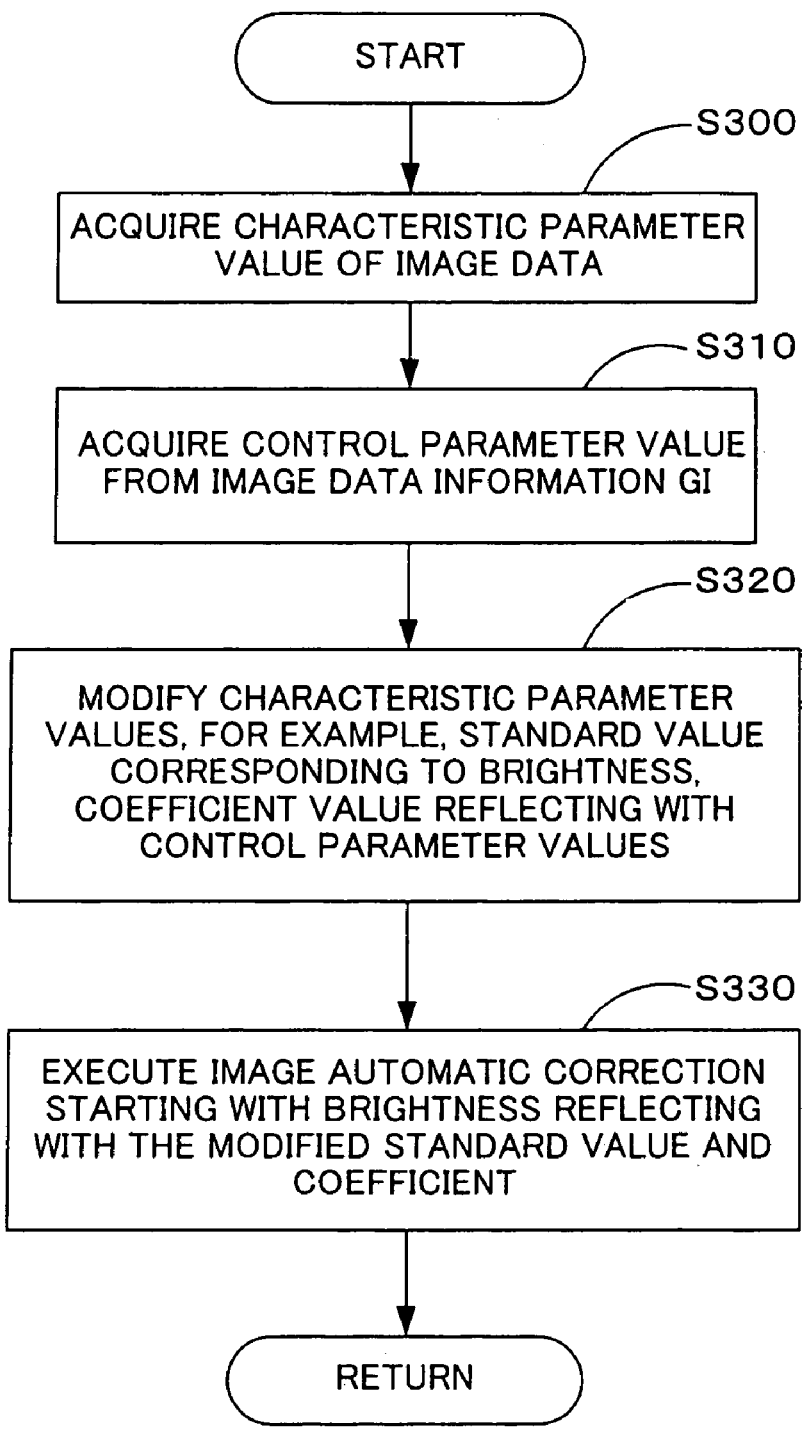
FIG. 11 is a flow chart illustrating the processing routine of automatic image adjustment in the color printer 20.

Image processing in the color printer 20 of the present embodiment will be described below with reference to FIGS. 9-11. FIG. 9 is a flow chart illustrating the processing routine of printing processing in the color printer 20 of the present embodiment. FIG. 10 is a flow chart illustrating the flow of image processing in the color printer 20. FIG. 11 is a flow chart illustrating the processing routine of automatic image adjustment in the color printer 20. In the image processing in the color printer 20 according to the present embodiment, the color space conversion processing is executed first and then the automatic image adjustment is executed.

If the memory card MC is inserted into a slot 34, the control circuit 30 (CPU 31) of color printer 20 reads out the image file 100 from the memory card MC, and the image file 100 that has been read out is temporarily stored in the RAM 33 (step S100). The CPU 31 retrieves the image output control information GI indicating the information during image data generation from the appended information storage region 102 of the image file 100 that has been read out (step S110). If the CPU 31 has retrieved and detected the image output control information (step S120: Yes), the CPU 31 acquires and analyzes the image output control information GI during image data generation (step S130). The CPU 31 executed the image processing (described hereinbelow in greater detail) based on the analyzed image output control information GI (step S140) and prints out the processed image data (step 150).

When the CPU 31 could not retrieve and detect the image output control information (step S120: No), the image output control information during image data generation cannot be taken into account. Therefore, the usual image processing is executed in which the image output control information that has been stored in advance as default values in the color printer 20, that is, various parameters values, are acquired from the ROM 32 (step S160). The CPU 31 prints out the processed image data (step S150) and ends the present processing routine.

Image processing executed in the color printer 20 will be described below in greater detail with reference to FIG. 10. The CPU 31 of color printer 20 picks up image data GD from the image file GF that has been read out (step S200). The digital still camera 12, as described above, stores the image data as a JPEG format file; in the JPEG file, the image data are stored by using the YCbCr color space to increase the compression ratio.

The CPU 31 executes 3×3 matrix computation S to convert the image data based on the YCrCb color space into image data based on the RGB color space (step S210). The matrix computation S is represented by the following computational formulas:

$$\begin{pmatrix} R \\ G \\ B \end{pmatrix} = S \begin{pmatrix} Y \\ Cb - 128 \\ Cr - 128 \end{pmatrix}$$

$$S = \begin{pmatrix} 1 & 0 & 1.40200 \\ 1 & -0.34414 & -0.71414 \\ 1 & 1.77200 & 0 \end{pmatrix}$$

The CPU 31 then executes gamma correction as well as matrix computation M with respect to the thus obtained image data based on the RGB color space (step S220). When gamma correction is executed, the CPU 31 acquires gamma value of DSC from the image output control information GI and executes gamma conversion processing with respect to video data by using the acquired gamma values. Matrix computation M is a computational processing executed for converting the RGB color space into the XYZ color space. Because the image file GF used in the present embodiment can contain color space information during image generation, if the image file GF contains the color space information, when the CPU 31 executes matrix computation M, it executes matrix computation by referring to the color space information and using the matrix (M) corresponding to the color space during image generation. The matrix computation M is represented by the following computational formulas:

$$\begin{pmatrix} X \\ Y \\ Z \end{pmatrix} = M \begin{pmatrix} Rt' \\ Gt' \\ Bt' \end{pmatrix}$$

$$M = \begin{pmatrix} 0.6067 & 0.1736 & 0.2001 \\ 0.2988 & 0.5868 & 0.1144 \\ 0 & 0.0661 & 1.1150 \end{pmatrix}$$

$Rt, Gt, Bt \geq 0$ $$Rt' = \left(\frac{Rt}{255}\right)^\gamma$$

$$Gt' = \left(\frac{Gt}{255}\right)^\gamma$$

$$Bt' = \left(\frac{Bt}{255}\right)^\gamma$$

$Rt, Gt, Bt < 0$ $$Rt' = -\left(\frac{-Rt}{255}\right)^\gamma$$

$$Gt' = -\left(\frac{-Gt}{255}\right)^\gamma$$

$$Bt' = -\left(\frac{-Bt}{255}\right)^\gamma$$

The color space of image data GD obtained after the matrix computation M has been executed is the XYZ color space. In prior art, the color space used during image processing in a printer or computer was limited to sRGB, and the color space of digital still camera 12 could not be used effectively. By contrast, in the present embodiment, when the image file GF contains a color space information, a printer (printer driver) is used which modifies the matrix (M) used in the matrix computation M correspondingly to the color space information. Therefore, the color space of digital still camera 12 is used effectively and correct color reproduction can be implemented.

Because the CPU 31 executes image adjustment based on discretionary information, it executes processing by which the color space of image data GD is converted from the XYZ color space into the wRGB color space, that is, executes matrix computation $N^{-1}$ and inverse gamma correction (step S230). The wRGB color space is wider than the sRGB color space. When gamma correction is executed, the CPU 31 acquires default gamma values of the printer from ROM 32 and executes the inverse gamma conversion processing with respect to video data by using the inverse number of the acquired gamma value. When matrix computation $N^{-1}$ is executed, the CPU 31 executes matrix computation by using the matrix ($N^{-1}$) corresponding to conversion to the wRGB color space from the ROM 31. The matrix computation $N^{-1}$ is represented by the following computational formulas:

$$\begin{pmatrix} Rw \\ Gw \\ Bw \end{pmatrix} = N^{-1} \begin{pmatrix} X \\ Y \\ Z \end{pmatrix}$$

$$N^{-1} = \begin{pmatrix} 3.30572 & -1.77561 & 0.73649 \\ -1.04911 & 2.1694 & -1.4797 \\ 0.0658289 & -0.241078 & 1.24898 \end{pmatrix}$$

$$Rw' = \left(\frac{Rw}{255}\right)^{1/\gamma}$$

$$Gw' = \left(\frac{Gw}{255}\right)^{1/\gamma}$$

$$Bw' = \left(\frac{Bw}{255}\right)^{1/\gamma}$$

The color space of image data GD obtained after the matrix computation $N^{-1}$ has been executed is the WRGB color space. The wRGB color space, as has been mentioned above, is wider than the sRGB color space and corresponds to a color space that can be generated by the digital still camera 12.

The CPU 31 executes the automatic adjustment processing of image quality (step S240). In the image quality automatic adjustment processing of the present embodiment, the characteristic parameter values indicating image quality are acquired by analyzing the image data GD contained in the image file GF, and the automatic adjustment of image quality for correction of the acquired characteristic parameter values is executed by taking account of the image output control information GI contained in the image file GF. Such an automatic adjustment processing of image quality will be described below in greater detail with reference to FIG. 11.

First, the CPU 31 analyzes the image data GD, acquires various characteristic parameters indicating the characteristics of image data GD, and temporarily puts them into the RAM 32 (step S300). The brightness parameter indicating the brightness characteristic is acquired as a brightness representative value Brep, among the image statistical values obtained by the analysis of image data GD. The CPU 31 analyzes the image output control information GI and acquires values of control parameters (information) controlling (designating)

the image outputs such as light source, exposure bias value, exposure time, diaphragm, ISO focal distance, and the like (step S310).

The CPU 31 changes (modifies) the standard values and coefficients that have been set for each of the parameters, while taking account of the acquired values of control parameters (step S320). The standard values and coefficients that have been set for each of the parameters are the values set under an assumption that the image data has been generated under typical image generation conditions (output control conditions). Accordingly, in order to implement automatic adjustment of image quality that accurately reflects the intentions of the photographer (person generating the image), the standard values and coefficients are changed by taking into consideration individual output control conditions, in particularly, with respect to the output control conditions that can be arbitrarily set by the photographer. The standard values and coefficients are the index values of parameters at which the output results of the image preset by image evaluation based on quantitative or functional evaluation are optimized.

First, the modification of brightness standard values that are set with respect to brightness parameters, among the characteristic parameters, will be explained. The brightness standard value Bstd is, for example, an eight-bit information that can take a value of 0-255, and the normal value thereof is set to 128. The brightness standard value Bstd is modified by adding to or deducting from the brightness normal value 128 a value calculated by using a conversion formula 0.1 EV (exposure bias value)=2 (brightness modification value) with respect to this normal value. Thus, Bstd becomes 128+brightness modification value. For example, if the exposure bias value is corrected by +1.0 EV, the brightness modification value becomes (1.0/0.1)×2=20, and the brightness standard value Bstd becomes 128+20=148. On the other hand, if the exposure bias value is corrected by −0.5 EV, the brightness modification value becomes −(0.5/0.1)×2=−10, and the brightness standard value Bstd becomes 128−10=118.

When the exposure bias value other than 0 is set, a decision can be made that the photographer conducted photographing by changing the brightness intentionally. Therefore, in order to reflect the photographer's intention, the brightness standard value Bstd is modified based on the exposure bias value, and automatic adjustment of brightness reflecting the photographer's intention is implemented.

The CPU 31 executes the automatic adjustment of image quality correcting the image data GD so as to bring it closer to the changed standard value (step S330). The correction bringing the brightness value of image data GD closer to the standard value is executed based on the following formula.

$$Brev=Int(\sqrt{(Bstd-Brep)}*4)$$

Figure 12:
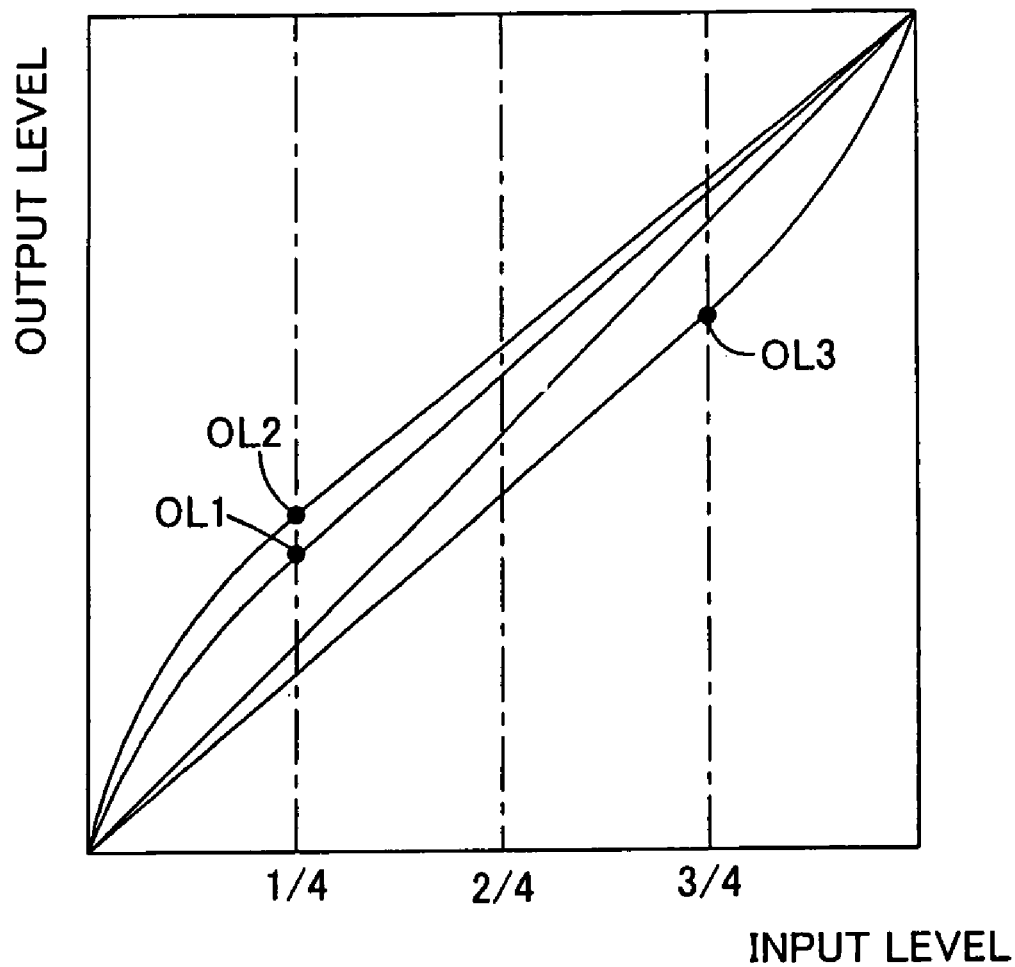
FIG. 12 is a graph illustrating schematically the relationship between the input level and output level of brightness.

The relationship between the input level and output level used when executing the correction which brings the brightness value of image data GD closer to the standard value will be explained below with reference to FIG. 12. FIG. 12 is a graph schematically illustrating the relationship between the input level and output level of brightness with respect to each pixel of image data. When the exposure bias value is a positive value and the correction increasing the brightness is executed, for example, the output levels OL1, OL2 are raised according to the correction level in the ¼ point of the input level. On the other hand, when the exposure bias value has a negative value and the correction decreasing the brightness is executed, for example, the output level OL3 is lowered according to the correction level in the ¾ point of the input level. Values excluding the point corresponding to the correction level are interpolated by a spline curve.

For example, when the brightness representative value Brep=100 and the exposure bias value is zero, the above formula gives a brightness correction level Brev of 10 (OL1). On the other hand, when the brightness representative value Brep=100 and the exposure bias value is 16, the above formula gives a brightness correction level Brev of 13 (OL3). When the brightness standard value Bstd was not modified by taking the exposure bias value into account, as long as the brightness representative value Brep was the same, it was not reflected in the output results of image data. However, if the brightness standard value Bstd is modified by taking the exposure bias value into account, the brightness correction level Brev can be corrected by three levels up as compared to the case when the exposure bias value was not taken into account. Therefore, the intentions of the photographer who wishes to increase the brightness of output results can be reflected in the output results of image data.

Alternatively, the brightness correction level Brev may be directly corrected up or down, without modifying the brightness standard value Bstd. For example, when the exposure bias value is set to 0.5 EV, using the conversion formula 0.1 EV=2(level) produces (0.5/0.1)×2=1, and the brightness correction level Brev becomes 10 +brightness standard value Bstd. If the brightness standard value Bstd is 10, a resulting brightness correction level Brev of 20 is obtained. This value, as described above, is used for modifying the tone curve for determining the output level corresponding to the input level of brightness value of image data GD, and the brightness of image data GD is adjusted by correcting the brightness value of each pixel of image data GD.

The CPU 31 returns to the image processing routine, which is the main routine, after the automatic adjustment other than the above-described brightness adjustment has been executed (step S360).

If the image quality adjustment processing is completed, the CPU 31 executes the wRGB color conversion processing and half-tone processing for printing (step S250). In the wRGB conversion processing, the CPU 31 refers to the look-up table (LUT) for conversion into the CMYK color space that corresponded to the wRGB color space stored in the ROM 31 and changes the color space of image data from the wRGB color space into the CMYK color space. Thus, image data composed of gradation values of R·G·B is converted into gradation values used in the color printer 20, for example, of six colors C·M·Y·K·LC·LM.

In the half-tone processing, the image data subjected to color conversion are received and the gradation number conversion processing is conducted. In the present embodiment, the image data after color conversion are represented as data having 256 gradation widths per each color. By contrast, in the color printer 20 of the present embodiment, only any one state of the "dots are formed" state and "dots are not formed" state is assumed and the color printer 20 of the present embodiment can locally represent only two gradations. Here, image data having 256 gradations is converted into the image data represented with two gradations that can be represented by the color printer 20. Examples of typical methods for such bigradation processing (binarization) include a method termed an error diffusion method and a method termed a textural dithering method.

In the color printer 20, prior to the color conversion processing, a resolution conversion processing is executed by which the resolution of image data is converted into the printing resolution. When the resolution of image data is lower than the printing resolution, the resolution conversion processing is executed by generating new data between the adjacent image data by conducting linear interpolation. Conversely, when the resolution of image data is higher than the printing resolution, the resolution conversion processing is executed by thinning out the image data at a constant ratio. The color printer 20 also executes the interlace processing by which the image data that has been converted to a format representing the presence or absence of dot formation is rearranged in the order in which it has to be transferred to the color printer 20.

As described above, with the color printer 20 of the present embodiment, the image quality of image data GD can be automatically adjusted by taking account of the image output control information GI contained in the image file GF. Therefore, even when the user arbitrarily sets the output control conditions of image data, executing the automatic adjustment of image quality modifies the arbitrary output control conditions and makes it possible to resolve the problem associated with the conventional image quality automatic adjustment function which could not reflect the user's intentions.

In particular, with the color printer 20 of the present embodiment, when the image quality of image data GD is automatically adjusted, modifying the brightness standard value Bstd by taking account of the exposure bias value makes it possible to correct the brightness correction level Brev up or down with respect to the case when the exposure bias value is not taken into account. Therefore, the photographer's intention of making the output results brighter or darker can be reflected in the output results of image data. Furthermore, when the exposure bias value is zero, a decision can be made that the photographer wants no intentional output results relating to brightness. Therefore, the brightness standard value Bstd is not modified.

Furthermore, because the image quality can be automatically adjusted by using the image output control information GI contained in the image file GF, high-quality printing results reflecting the user's photographing intentions can be easily obtained without conducting image quality adjustment on the printer driver or a photo retouch application.

Moreover, in the above-described embodiment, an example of automatic execution of image quality adjustment processing was described. However, an image quality automatic adjustment button may be provided on a control panel of color printer 20 and the image quality automatic adjustment processing of the above-described embodiment may be executed only when the image quality automatic adjustment mode is selected with this image quality automatic adjustment button.

F. Other Embodiments

In the above-described embodiment, the entire image processing is conducted in the color printer 20, rather than via a personal computer PC, and the dot pattern is formed on a printing medium according to the generated image data GD. However, the entire image processing or part thereof may be executed in the computer. In such a case, image processing is conducted by assigning the image processing function that has been explained with reference to FIG. 11 to an image data processing application such as a retouch application or a printer driver installed on a computer hard disk or the like. The image file GF generated by the digital still camera 12 is supplied to the computer via a cable or a memory card MC. In the computer, the application is initiated by the user's operation, and reading of the image file GF, analysis of image output control information GI, and conversion and adjustment of image data GD are executed. Alternatively, the application may be initiated automatically and reading of the image file GF, analysis of image output control information GI, and conversion and adjustment of image data GD may be executed automatically by detecting the insertion of a memory card MC or a cable.

Furthermore, in the explanation of automatic adjustment of image quality in the above-described embodiment, most attention has been concentrated on correction of brightness that has taken account of the exposure bias value. However, automatic adjustment of image quality which reflected the image output control information GI can be also executed, for example, with respect to characteristic parameter values of image data GD, such as shadow-contrast point, contrast, color balance, color saturation, and sharpness.

In addition, selecting of characteristic parameters for executing the automatic adjustment of image quality may be made possible. For example, the color printer 20 may be provided with a parameter selection button or a button for selecting photographic mode parameters obtained by combining the prescribed parameters according to the photographic object, and the parameters for executing the automatic adjustment of image quality may be selected with those selection buttons. Furthermore, when the automatic adjustment of image quality is executed on a personal computer, the parameters for executing the automatic adjustment of image quality may be selected on the user interface of printer driver or retouch application.

Figure 13:
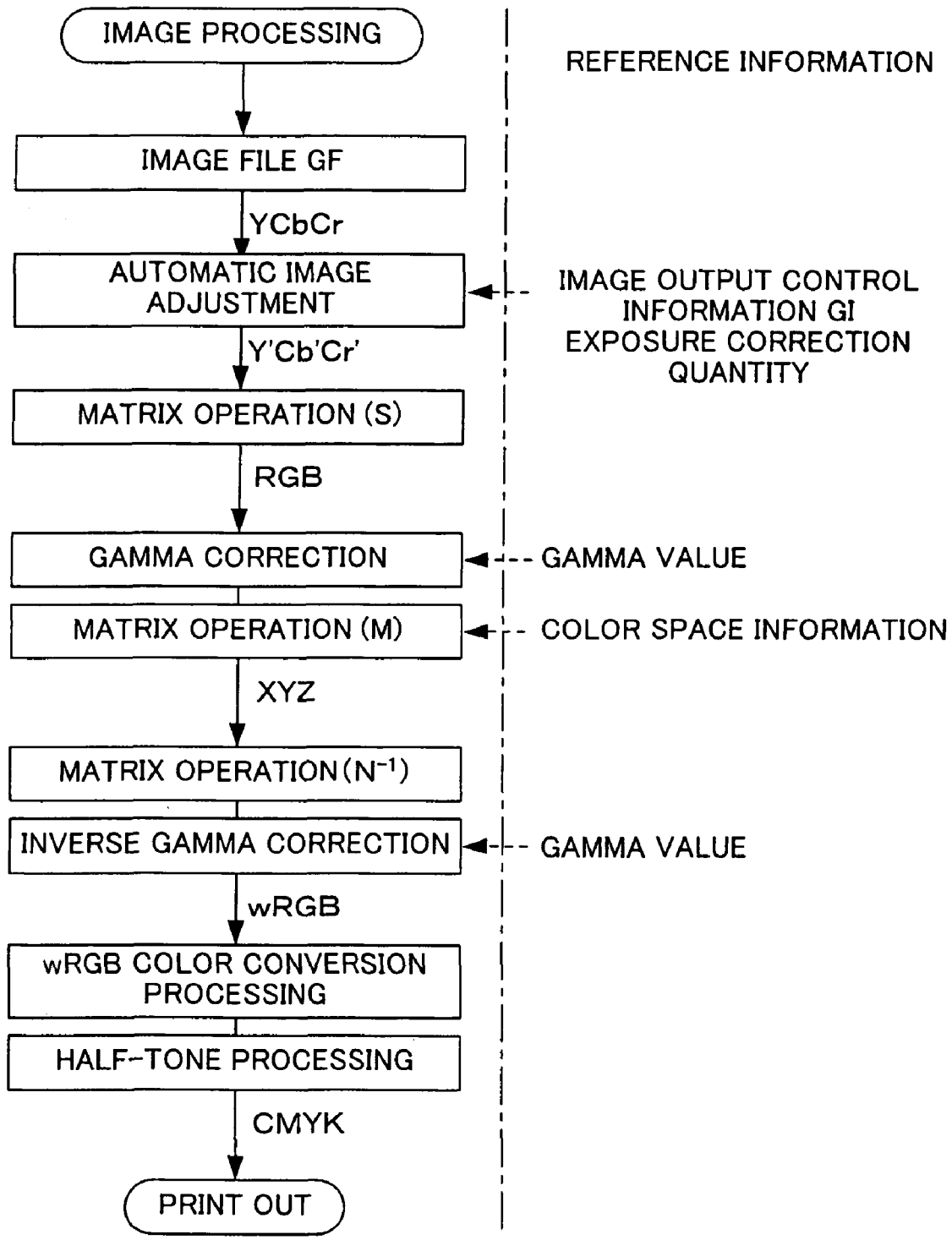
FIG. 13 is a flow chart illustrating the processing routine of printing processing in the color printer 20 of the other embodiment.

In the image processing in the color printer 20, the automatic adjustment processing of image quality may be executed first, as shown in FIG. 13, and then the conversion of color space may be executed. Basic information may be also processed.

In all of the above-described embodiments, the color printer 20 was used as an output device. However, display devices such as CRT, LCD, projector, and the like, can be also used as the output device. In such a case, for example, an image processing program (display driver) for executing the image processing that was explained with reference to FIGS. 10, 11 is executed with the display device serving as the output device. Alternatively, when a CRT or the like functions as the display device of a computer, the image processing program is executed in the computer. However, the image data that are finally output have the RGB color space rather than the CMYK color space.

In such a case, the image output control information GI during image data generation can be reflected in the displayed results on the display device such as a CRT or the like, in the same manner as the information during image data generation was reflected in the printing results obtained with the color printer 20. Therefore, the image data GD generated by the digital still camera 12 can be displayed with a higher accuracy.

The image output device in accordance with the present invention was described hereinabove based on embodiments thereof. The above-described preferred embodiments of the present invention are, however, employed only to facilitate the understanding of the present invention and place no limitation on the present invention. The present invention can be changed and modified without departing from the spirit of the invention, or the scope of the claims, and it goes without saying that the present invention includes the equivalents thereof.

In the above-described embodiments, parameters such as a light source, exposure bias value, target color space, brightness, and sharpness were used as the image output control information GI. However what parameter is to be used as the mage output control information GI can be decided at one's discretion.

Values of the parameters presented in the table in FIG. 8 are nothing but examples and the invention of the present application is not limited to those values. Furthermore, values of matrices S, M, $N^{-1}$ in the mathematical formulas are nothing but examples, and it goes without saying that those values can be changed suitably by the target color space or color space that can be used in the color printer 20.

In the explanation of the above-described embodiments, the digital still camera 12 was employed as the image file generation device. However, a scanner, a digital video camera, and the like can be also used for this purpose. When a scanner is used, the designation of download data information of image file GF may be executed on a computer PC, or the scanner may be provided with a preset button, a display screen for discretionary setting, and a setting button which have the presetting invention shared therebetween for information setting, and the designation can be executed by the scanner alone.

In the above-described embodiments, the files in the Exif format were described as specific examples of image files GF, but the format of image files in accordance with the present invention is not limited to such a format. Thus, an image file may be used which comprises the image data generated in the image data generation device and the image output control information GI describing the conditions (information) during image data generation. With such a file, the image quality of image data generated in the image file generation device can be appropriately automatically adjusted and output from the output device.

The digital still camera 12 and color printer 20 used in the above-described embodiments are nothing but examples, and the configuration thereof is not limited to the described contents of the embodiments. It will suffice to provide the digital still camera 12 at least with the function of generating the image file GF of the above-described embodiments. Furthermore, it will suffice if the color printer 20 can analyze the image output control information GI of the image file GF of the present embodiments, automatically adjust the image quality by reflecting the user's intention, especially, with respect to the brightness, and output (print out) the image.

In the above-described embodiments, the case in which the image data GD and image output control information GI were contained in the same image file GF has been taken as an example. However, the image data GD and image output control information GI are not necessarily required to be stored in the same file. Thus, it will suffice to correlate the image data GD with the image output control information GI will suffice. For example, it is also possible to generate the correlating data for correlating the image data GD with the image output control information GI, to store one or a plurality of image data and image output control information GI in respective independent files, and to refer to the correlated image output control information GI when the image data GD is processed. In such a case, though the image data and image output control information GI are stored in separate files, during image processing which uses the image output control information GI, the image data and image output control information GI are integrally and inseparably related to each other and function substantially in the same manner as in the case when they were stored in the same file. Thus, the aspect of using the image data and image output control information GI which are associated with each other, at least during image processing, is included in the image file GF in the present embodiments. Furthermore, dynamic image files stored in optical disk media such as CD-ROM, CD-R, DVD-ROM, DVD-RAM are also included.

What is claimed is:

1. An output device which uses image data and photographic information relating to an image quality in a case of image data photographing in a digital still camera, which includes at least exposure bias value information in image data generation and which has been associated with said image data by said digital still camera, and outputs said image data, said output device comprising:
   an image quality parameter value acquirer that analyzes said image data and acquires a value for an image quality parameter which indicates at least a characteristic relating to a brightness of said image data;
   an image quality adjuster that computes an image quality adjustment quantity for each image data from a standard image quality parameter value and said image quality parameter value, modifies said image quality adjustment quantity with individual photographic information, and adjusts an image quality of said image data by applying the modified image quality adjustment quantity, wherein said standard image quality parameter value is determined in advance for said image quality parameter value relating at least to said brightness, and said image quality adjuster uses said photographic information to modify said image quality adjustment quantity regardless of a value of said photographic information; and
   an output that outputs said image data that has been subjected to said image quality adjustment.

2. An output device according to claim 1, wherein
   said image quality adjuster adjusts the image quality of said image data so as to reduce or eliminate deviations in said image quality parameter value from said standard image quality parameter value by taking account of said exposure bias value information.

3. An output device according to claim 1, wherein
   said image quality adjuster adjusts the image quality of said image data by computing the image quality adjustment quantity from said standard image quality parameter value and said image quality parameter value, modifying said image quality adjustment quantity by taking account of said exposure bias value information, and using said image quality adjustment quantity that has been modified.

4. An output device according to claim 1, further comprising:
   a standard image quality parameter value modifier for modifying said standard image quality parameter value based on said exposure bias value information, and wherein
   said image quality adjuster adjusts the image quality of said image data based on said modified standard image quality parameter value and said acquired image quality parameter value, instead of said standard image quality parameter value, said acquired image quality parameter value, and said exposure bias value information.

5. An output device according to claim 4, wherein
   said standard image quality parameter value modifier does not execute modification of said standard image quality parameter value when the exposure bias value has been set to zero as a result of analysis of said photographic information.

6. An image data processing device which uses image data and photographic information relating to an image quality in a case of image data photographing in a digital still camera, which includes at least exposure bias value information in image data generation and which has been associated with said image data by said digital still camera, and processes said image data, said image data processing device comprising:

an obtainer that obtains said image data and said photographic information;

an image quality parameter value acquirer that analyzes said image data to acquire a value of an image quality parameter indicating at least a characteristic relating to a brightness of said image data; and an image quality adjuster that computes an image quality adjustment quantity for each image data from a standard image quality parameter value and said image quality parameter value, modifies said image quality adjustment quantity with individual photographic information, and adjusts an image quality of said image data by applying the modified image quality adjustment quantity, wherein said standard image quality parameter value is determined in advance for said image quality parameter value relating at least to said brightness, and said image quality adjuster uses said photographic information to modify said image quality adjustment quantity regardless of a value of said photographic information.

7. An image data processing device according to claim 6, wherein
said image quality adjuster adjusts the image quality of said image data so as to reduce or eliminate deviations in said image quality parameter value from said standard image quality parameter value by taking account of said exposure bias value information.

8. An image data processing device according to claim 6, wherein
said image quality adjuster adjusts the image quality of said image data by computing the image quality adjustment quantity from said standard image quality parameter value and said image quality parameter value, modifying said image quality adjustment quantity by taking account of said exposure bias value information, and using said image quality adjustment quantity that has been modified.

9. An image data processing device according to claim 6, further comprising:
a standard image quality parameter value modifier for modifying said standard image quality parameter value based on said exposure bias value information, and wherein
said image quality adjuster adjusts the image quality of said image data based on said modified standard image quality parameter value and said acquired image quality parameter value, instead of said standard image quality parameter value, said acquired image quality parameter value, and said exposure bias value information.

10. An image data processing device according to claim 9, wherein
said standard image quality parameter value modifier does not execute modification of said standard image quality parameter value when the exposure bias value has been set to zero as a result of analysis of said photographic information.

11. A method for image quality adjustment of image data comprising:
acquiring image data and photographic information relating to an image quality in a case of image data photographing in a digital still camera, which includes at least exposure bias value information occurring during image data generation, and which has been associated with said image data by said digital still camera;
analyzing said image data to acquire a value of an image quality parameter indicating at least a characteristic relating to a brightness of said image data;
analyzing said photographic information to acquire an exposure bias value from said exposure bias value information;
computing an image quality adjustment quantity for each image data from a standard image quality parameter value and said image quality parameter value;
modifying said image quality adjustment quantity with individual photographic information; and
adjusting an image quality of said image data by applying the modified image quality adjustment quantity, wherein said standard image quality parameter value is determined in advance for said image quality parameter relating at least to said brightness, and said adjusting uses said photographic information to modify said image quality adjustment quantity regardless of the value of said exposure bias value acquired by analyzing said photographic information.

12. A method for image quality adjustment according to claim 11, wherein the image quality of said image data is adjusted so as to reduce or eliminate deviations in said image quality parameter value from said standard image quality parameter value reflecting said exposure bias value information.

13. A method for image quality adjustment according to claim 11, wherein the image quality of said image data is adjusted by computing the image quality adjustment quantity from said standard image quality parameter value and said image quality parameter value, modifying said image quality adjustment quantity by taking account of said exposure bias value information, and using said image quality adjustment quantity that has been modified.

14. A method for image quality adjustment according to claim 11, further comprising:
modifying the standard image quality parameter value that has been determined in advance with respect to said image quality parameter value relating to at least said brightness, by reflecting said acquired exposure bias value; and
adjusting the image quality of said image data based on said modified standard image quality parameter value and said acquired image quality parameter value, instead of said standard image quality parameter value, said acquired image quality parameter value, and said exposure bias value information.

15. A method for image quality adjustment according to claim 14, wherein the modification of said standard image quality parameter value is not conducted when said acquired exposure bias value is zero.

16. A computer-readable medium non-transitory storing a program for adjusting the image quality of image data, wherein said program instructs a computer to execute the functions of:
acquiring image data and photographic information relating to an image quality in a case of image data photographing in a digital still camera, which includes at least exposure bias value information occurring during image data generation, and which has been associated with said image data by said digital still camera;
analyzing said image data to acquire a value of an image quality parameter indicating at least a characteristic relating to a brightness of said image data;
analyzing said photographic information to acquire an exposure bias value from said exposure bias value information;
computing an image quality adjustment quantity for each image data from a standard image quality parameter value and said image quality parameter value;

modifying said image quality adjustment quantity with individual photographic information; and adjusting an image quality of said image data by applying the modified image quality adjustment quantity, wherein said standard image quality parameter value is determined in advance for said image quality parameter relating at least to said brightness, and said adjusting uses said photographic information to modify said image quality adjustment quantity regardless of the value of said exposure bias value acquired by analyzing said photographic information.

17. A computer-readable medium non-transitory according to claim 16, wherein the function of adjusting the image quality of said image data is a function of adjusting the image quality of said image data so as to reduce or eliminate deviations in said image quality parameter value from said standard image quality parameter value by taking account of said exposure bias value information.

18. A computer-readable medium non-transitory according to claim 16, wherein the function of adjusting the image quality of said image data is a function of adjusting the image quality of said image data by computing the image quality adjustment quantity from said standard image quality parameter value and said image quality parameter value, modifying said image quality adjustment quantity by taking account of said exposure bias value information, and using said image quality adjustment quantity that has been modified.

19. A computer-readable medium non-transitory according to claim 16, wherein said program further instructs a computer to execute the function of:

modifying the standard image quality parameter value that has been determined in advance with respect to said image quality parameter value relating to at least said brightness, by reflecting said acquired exposure bias value, and wherein the function of adjusting the image quality of said image data is executed by the computer based on said modified standard image quality parameter value and said image quality parameter value, instead of said standard parameter value, said image quality parameter value, and said exposure bias value.

20. A computer-readable recording medium non-transitory according to claim 19, wherein a function is executed by a computer such that modification of said standard image quality parameter value is not conducted when said acquired exposure bias value is zero.

* * * * *